US009626328B1

(12) United States Patent
Kumar et al.

(10) Patent No.: US 9,626,328 B1
(45) Date of Patent: Apr. 18, 2017

(54) METHOD AND SYSTEM FOR ON-DEMAND AGGREGATED LOGGING FOR DISTRIBUTED SYSTEMS

(71) Applicant: EMC Corporation, Hopkinton, MA (US)

(72) Inventors: Vinod Kumar, Bangalore (IN); Pankaj Pradhan, Bangalore (IN); Ravi Ranjan Jha, Bangalore (IN); Gourav Mukherjee, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 733 days.

(21) Appl. No.: 13/921,335

(22) Filed: Jun. 19, 2013

(51) Int. Cl.
*G06F 15/173* (2006.01)
*G06F 15/163* (2006.01)

(52) U.S. Cl.
CPC .................. *G06F 15/163* (2013.01)

(58) Field of Classification Search
CPC ........... G06F 11/3476; G06F 17/30867; G06F 17/30572; G06F 11/327; G06F 17/30144; G06F 17/30185; G06F 17/30368; G06F 21/552; G06F 15/173; G06F 17/30
See application file for complete search history.

(56) References Cited

U.S. PATENT DOCUMENTS

| | | | | |
|---|---|---|---|---|
| 2003/0055809 A1* | 3/2003 | Bhat | ................ | G06F 17/30368 |
| 2003/0086536 A1* | 5/2003 | Salzberg | ................ | H04M 3/22 379/15.02 |
| 2005/0138111 A1* | 6/2005 | Aton | ................ | G06F 11/3476 709/201 |
| 2006/0277162 A1* | 12/2006 | Smith | ................ | G06F 17/30386 |
| 2007/0283194 A1* | 12/2007 | Villella | ................ | G06F 11/3476 714/57 |
| 2008/0168531 A1* | 7/2008 | Gavin | ................ | H04L 63/1408 726/1 |
| 2011/0276396 A1* | 11/2011 | Rathod | ................ | G06F 17/30867 705/14.49 |
| 2011/0314148 A1* | 12/2011 | Petersen | ................ | G06F 11/3476 709/224 |

* cited by examiner

*Primary Examiner* — Benjamin M Thieu
(74) *Attorney, Agent, or Firm* — Dergosits & Noah LLP; Todd A. Noah (57) ABSTRACT

On-demand aggregated logging for distributed systems is described. An identification of a logging condition is received via a first user interface. The logging condition is sent to multiple logging elements, wherein each of the multiple logging elements is executing on a corresponding one of multiple distributed systems components. A logging element determines whether a local runtime condition matches the logging condition. The logging element sends a local log associated with the local runtime condition to an aggregating logger, wherein the local log is supplemented with information that identifies the logging condition, in response to a determination that the local runtime condition matches the logging condition. The aggregating logger creates an aggregated log based on the local log and the supplemented information. The aggregated log is output via a second user interface to enable resolution of a problem associated with the multiple distributed systems components.

20 Claims, 3 Drawing Sheets

METHOD AND SYSTEM FOR ON-DEMAND AGGREGATED LOGGING FOR DISTRIBUTED SYSTEMS

BACKGROUND

Logs are important runtime information for any enterprise application deployed in production. Information extracted out of logs is used in a wide variety of ways over the lifetime of any application deployment, such as identifying access and/or security violations, troubleshooting a product issue, analyzing application performance, extracting performance metrics such as response times and run time memory usage, building a knowledge base related to usage patterns and/or trends, and analyzing large amounts of data, such as recommendation engines. Often the information that is captured in logs is turned into knowledge which can be used to improve the predictability and/or usability of an enterprise application. The kind of information and the amount of information that needs to be captured and processed in logs varies based on the requirements. For example, a logging mechanism that probes logs for security violations may evaluate information related to users, access control, and sequences of actions that have been performed on the data managed by that enterprise application. Traditional logging mechanisms mostly rely on the log statements that have been embedded into the business logic of enterprise applications for various levels and details to generate a set of logs. Single log statements are used to extract all of the information required to analyze all kinds of issues.

Enterprise applications are typically executed in a distributed system. A distributed system is a software system in which components located on networked computers communicate and coordinate their actions by passing messages. The components interact with each other in order to achieve a common goal. Examples of distributed systems vary from service-oriented architecture-based systems to peer-to-peer applications. Each component in a distributed system may have its own specific logging mechanism that locally stores its own corresponding logs.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

In the prior art, when an application user encounters a problem in a distributed system, an administrator has to go through the lengthy and time-consuming process of requesting the locally stored logs from every networked computer. Some of the information in the local logs may be outdated information, and most of the information in large local logs is irrelevant to the specific problem. The administrator may spend significantly more time in collecting the local logs and sifting through the massive amounts of data in the local logs than actually resolving a specific problem. Furthermore, the administrator may need to turn on different logging levels for the application in order to understand the state of the application in the distributed system, but some applications need to restart to change their logging levels, and restarting an application may not be possible due to business continuity needs.

Embodiments herein provide on-demand aggregated logging for distributed systems. An identification of a logging condition is received via a first user interface. For example, an administrator responds to a user report of a problem by entering "username=foo, activity=checkout, and product=enterprise content management system content server" as a logging condition. The logging condition is sent to multiple logging elements, wherein each of the multiple logging elements is executing on a corresponding one of multiple distributed systems components. For example, the system sends the logging condition to the logging elements executing on each of the networked computers. A logging element determines whether a local runtime condition matches the logging condition. For example, a logging element monitors its local runtime conditions on its own networked computer to determine when the local runtime condition matches the received logging condition. The logging element sends a local log associated with the local runtime condition to an aggregating logger, wherein the local log is supplemented with information that identifies the logging condition, in response to a determination that the local runtime condition matches the logging condition. For example, when the local runtime condition matches the received logging condition, the logging element sends the local log for that local runtime condition, along with a logging condition identifier, to an aggregating logger. The aggregating logger creates an aggregated log based on the local log and the supplemented information. For example, the aggregating logger collects the local logs which identify the logging condition that have been sent from the logging elements, and creates an aggregated log for the specific logging condition. The aggregated log is output via a second user interface to enable resolution of a problem associated with the multiple distributed systems components. For example, the aggregating logger outputs the aggregated log to an administrator, wherein the aggregated log enables the administrator to quickly and easily identify the source of the application user's problem. On-demand aggregated logging creates an aggregated log that is easily accessible for an administrator of a distributed system, without the need to restart any applications. On-demand aggregated logging potentially reduces the amount of data stored in the aggregated log because on-demand aggregated logging will only aggregate logs that match the specified logging condition. On-demand aggregated logging helps administrators and/or troubleshooters to quickly comprehend their log data with better insight, thereby significantly improving trouble shooting and root-cause analysis.

Figure 1:
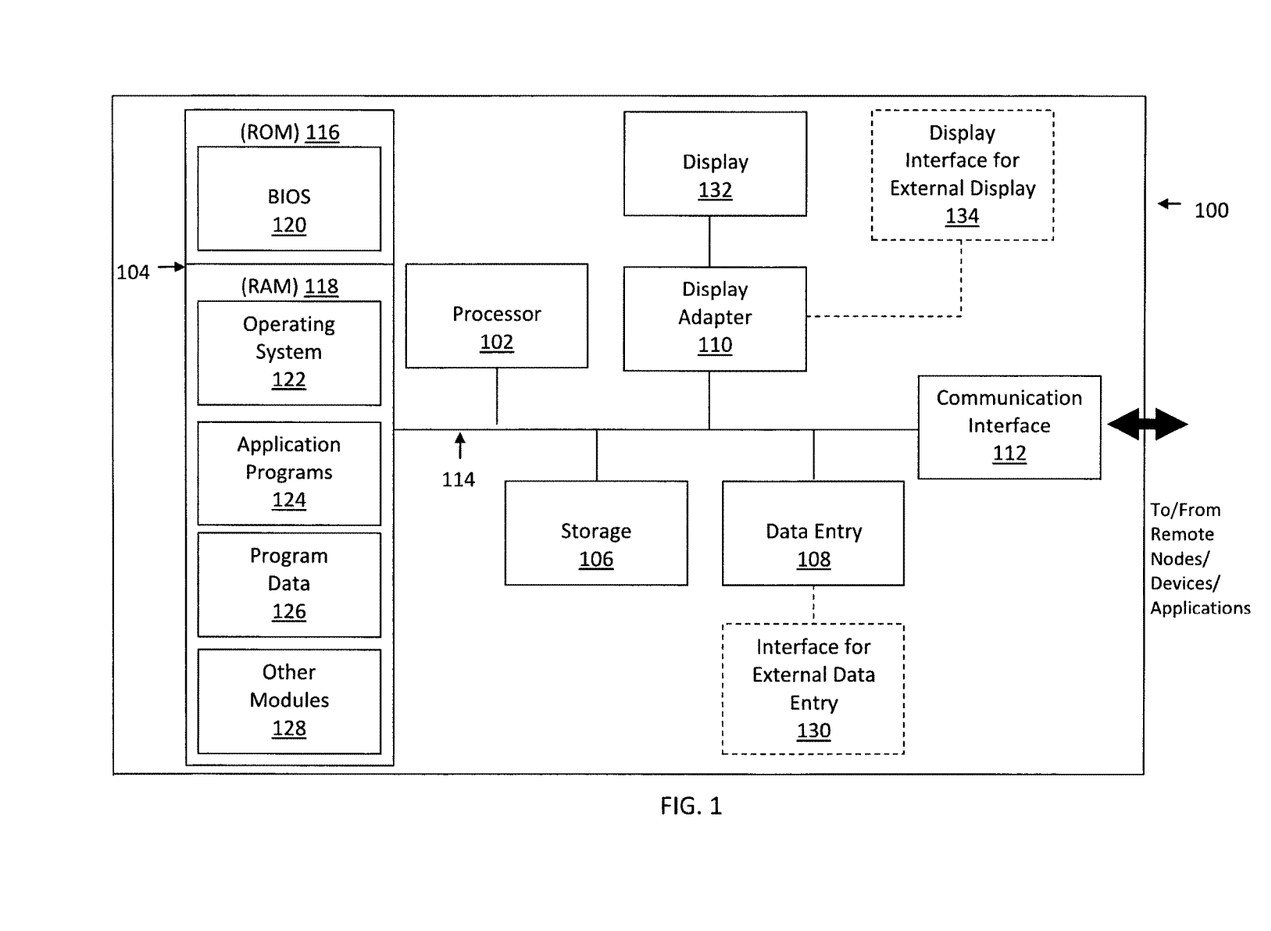
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for on-demand aggregated logging for distributed systems.

In the prior art, a distributed system administrator may spend significantly more time in collecting the local logs and sifting through the massive amounts of data in the local logs than actually resolving a specific problem. Furthermore, the administrator may need to restart an application to change its logging levels, but restarting an application may not be possible due to business continuity needs. Embodiments herein provide on-demand aggregated logging, which creates an aggregated log that is easily accessible for an administrator of a distributed system, without the need to restart any applications. On-demand aggregated logging potentially reduces the amount of data stored in the aggregated log because on-demand aggregated logging will only aggregate logs that match the specified logging condition. On-demand aggregated logging helps administrators and/or troubleshooters to quickly comprehend their log data with better insight, thereby significantly improving trouble shooting and root-cause analysis.

Figure 2:
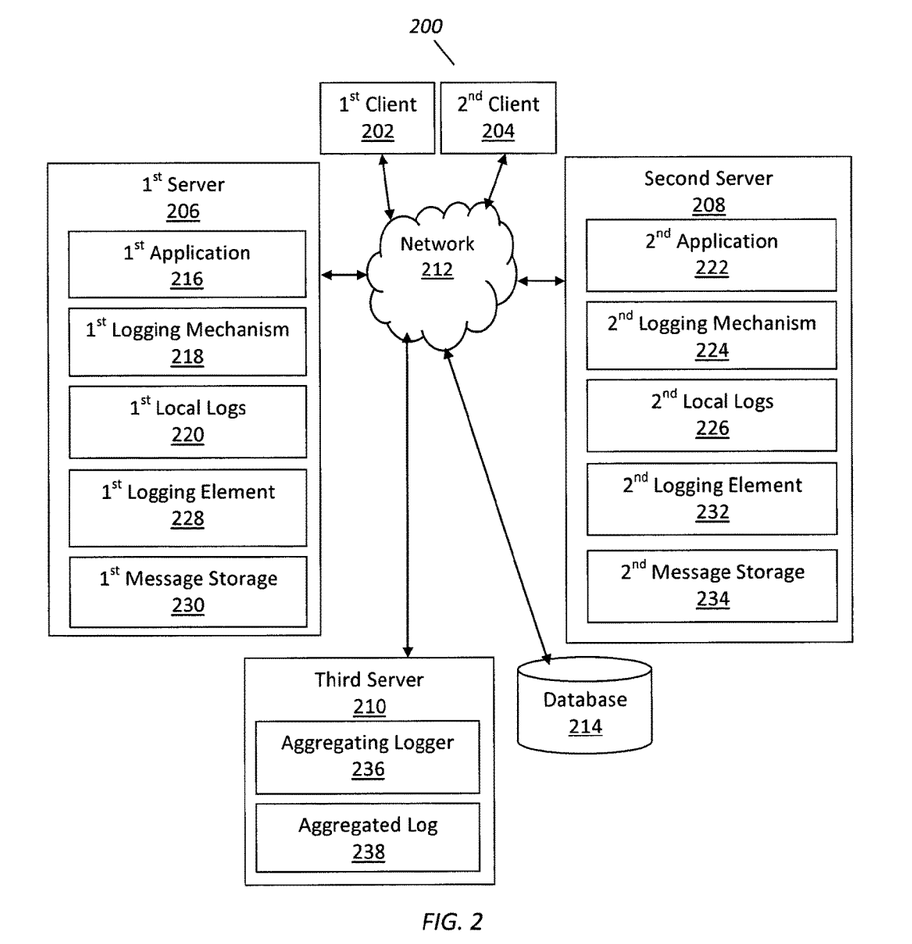
FIG. 2 illustrates a block diagram of an example system for on-demand aggregated logging for distributed systems, under an embodiment.

FIG. 2 illustrates a block diagram of a system that implements on-demand aggregated logging for distributed systems, under an embodiment. The on-demand aggregated logging may be portable, such that it can aggregate logging in many different environments. The on-demand aggregated logging is scalable, aggregating logging for a distributed system of anywhere from two computers to thousands of computers. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of data for different client users.

In an embodiment, the system 200 represents a cloud computing system that includes a first client 202, and a second client 204; and a first server 206, a second server 208, and a third server 210 that are provided by a hosting company. The clients 202-204 and the servers 206-210 communicate via a network 212, and may store data in a database 214. Although FIG. 2 depicts the database 214 as separate from the servers 206-210, the database 214 may reside partially or fully in any combination of the servers 206-210. Although FIG. 2 depicts the system 200 with two clients 202-204, three servers 206-210, one network 212, and one database 214, the system 200 may include any number of clients 202-204, any number of servers 206-210, any number of networks 212, and any number of databases 214. Each of the clients 202-204 and the servers 206-210 is substantially similar to the system 100 depicted in FIG. 1. The first client 202 enables an application user to communicate with the servers 206-208 and the database 214 in a distributed system, whereas the second client 204 enables a system administrator to communicate with the servers 206-210 and the database 214 in the distributed system.

The first server 206 executes a first application 216 and also executes a first logging mechanism 218 to log activities of the first application 216 and to store logs of these activities in first local logs 220. Similarly, the second server 208 executes a second application 222 and also executes a second logging mechanism 224 to log activities of the second application 222 and to store logs of these activities in second local logs 226. The first server 206 also executes a first logging element 228 which enables on-demand aggregated logging for the first server 206 by leveraging the existing first local logs 220 created by the existing first logging mechanism 218, and which may temporarily store logging messages in a first message storage 230. Similarly, the second server 208 also executes a second logging element 232 which enables on-demand aggregated logging for the second server 208 by leveraging the existing second local logs 226 created by the existing second logging mechanism 224, and which may temporarily store logging messages in a second message storage 234. Although FIG. 2 depicts two servers 206 and 208, with their corresponding two sets of system elements 216-220 with 228-230, and 222-226 with 232-234, the system 200 may include any number of servers and their corresponding sets of system elements.

The third server 210 executes an aggregating logger 236 that enables on-demand aggregated logging for the servers 206-208 by creating an aggregated log 238. Although FIG. 2 depicts only one of the third server 210 with its corresponding sets of system elements 236-238, the system 200 may include any number of servers that include corresponding aggregating loggers 236 and aggregated logs 238.

A logging element registers a corresponding distributed systems component and the aggregating logger 236 creates a unique identifier for the corresponding distributed systems component. For example, during startup the first logging element 228 registers the first server 206 as a distributed system component with the aggregated logger 236, and the aggregated logger 236 responds by creating the identifier "400" for first server 206. A logging element uses its unique component identifier to generate log message sequence identifiers.

A logging element sends an activity list associated with a corresponding distributed systems component to the aggregated logger 236, wherein a logging condition is based on an activity of the activity list, and an activity is a public method name. For example, the first logging element 228 sends an activity list associated with the first application 216 to the aggregated logger 236, wherein a subsequent logging condition is based on the "checkout" activity of the activity list. The system administrator has the flexibility to identify for which activities the logs may be aggregated. The bootstrap for a logging element publishes the activities associated with the logging element's component to the aggregated logger 236.

The client 204 sends an identification of a logging condition to the aggregating logger 236. The logging condition may include a user identifier, an application identifier, and/or an identifier associated with a corresponding distributed systems component. For example, a system administrator responds to an application user's report of a problem by entering "username=foo, activity=checkout, and product=enterprise content management system content server" as a logging condition. In another example, a system administrator responds to an application user's report of a problem by entering "username=jerry, activity=export, and product=enterprise content management system webtop" as a logging condition. Examples of other types of requests include save requests, import requests, and check-in requests. The enterprise content management system may be EMC® Corporation's Documentum.

The aggregating logger 236 sends the logging condition to multiple logging elements 228-232, wherein each of the multiple logging elements 228-232 is executing on a corresponding one of multiple distributed systems components 206-208. For example, the aggregating logger 236 sends the logging condition to the logging elements 228-232 executing on the networked computers 206-208.

A logging element determines whether a local runtime condition matches the logging condition, wherein a runtime condition is the current thread activity name and runtime information. For example, the first logging element 228 monitors its local runtime conditions on its own networked computer 206 to determine when the local runtime condition matches the received logging condition. A logging element may set and reset the runtime context.

A logging element sends a local log associated with a local runtime condition to the aggregating logger 236, wherein the local log is supplemented with information that identifies the logging condition, in response to a determination that the local runtime condition matches the logging condition. For example, when the same user retries the checkout request using the same product, the local runtime condition matches the received logging condition, and the first logging element 228 sends the local log, along with an identifier of the logging condition, for that local runtime condition to the aggregating logger 236.

A logging element may use different ways to access local logs. For example. the first logging element 228 intercepts a local log before the first logging mechanism 218 stores the local log in the first local logs 220, and sends the local log to the aggregating logger 236. In another example, the first logging element 228 sends the local log to the aggregating logger 236 concurrently with the first logging mechanism 218 storing the local log in the first local logs 220. In yet another example, the first logging element 228 reads the local log from the first local logs 220 and sends the local log to the aggregating logger 236 after the first logging mechanism 218 stored the local log in the first local logs 220.

A logging element may send supplemental information associated with the local log, such as a distributed system component identifier, a log message identifier, a request identifier, and the logging condition. A logging element may generate a sequential unique message identifier for each local log, keep track of the request log message count, and keep track of each product log message count within the scope of each request. For example, a first log message identifier of "400.2.5" identifies that the corresponding local log message was generated by a component with the component identifier of "400" as a result of the 5th log statement of the $2^{nd}$ request. In another example, a second log message identifier of "400.2.5.500.1.3" identifies that the corresponding local log message was generated by a component with the component identifier of "500" as a result of the $3^{rd}$ log statement of the $1^{st}$ request, in which the component "500" was called from the component "400." The first three digits of the second log message identifier, "400.2.5" are from the first log message identifier generated from by the component with the component identifier of "400." Generating and storing a unique correlation identifier for a method/function call in a distributed environment is disclosed in EXECUTION PATH DETERMINATION IN A DISTRIBUTED ENVIRONMENT, U.S. patent application Ser. No. 13/630, 966, by Vinod Kumar et al., filed Sep. 28, 2012, the entire contents of which are incorporated herein by reference.

A logging element may send a local log to a message storage prior to sending the local log from the message storage to the aggregating logger, wherein sending the local log from the message storage is based on a duration of time that the local log is stored in the message storage, a remaining capacity associated with the message storage, and/or a number of local logs stored in the message storage. For example, the first logging element 228 initially sends its local logs to the first message storage 230 because sending the local logs directly to the aggregating logger 236 does not scale in an enterprise production environment and has an adverse impact on the distributed system's performance. A system administrator has the flexibility to send single logs or batches of logs together in a synchronous mode and/or an asynchronous mode.

If a logging element sends local logs to the aggregated log 238 for a top level component, the logging element may send local logs to the aggregated log 238 for all of the other subcomponents in the path of the request for the top level component. For example, if the first logging element 228 sends local logs for the first application 216 based on the first application 216 being requested to execute as part of a checkout request, the first logging element 228 also sends local logs for the two sub-components of the first application 216 if the two sub-components of the first application 216 are also requested to execute as part of the checkout request.

If a logging element sends local logs in batches, the aggregating logger 236 processes the batches and saves each local log separately.

The aggregating logger 236 creates the aggregated log 238 based on the local log and the supplemented information. For example, the aggregating logger 236 collects the local logs sent from the logging elements 228 and 232, and creates one aggregated log 238 for the logging condition based on the user "foo," the activity "checkout," and the product "content server;" and another aggregated log 238 for the logging condition based on the user "jerry," the activity "export," and the product "webtop." The aggregating logger 236 may store component deployment information, unique component identifiers, component activities, and a variety of logging conditions in a persistence store.

The aggregated log 238 is output via a second user interface to enable resolution of a problem associated with the multiple distributed systems components. For example, the aggregating logger 236 outputs the aggregated log 238 to an administrator, wherein the aggregated log 238 enables the administrator to quickly and easily identify the source of the application user's problem. The system administrator may use the client 204 to view the aggregated logs that are aggregated together based on a common logging condition by simply identifying the common logging condition. After the system administrator resolves the application user's problem, the system administrator may reset the specific logging condition, such that the logging elements no longer send local logs to the aggregated log 238 when the runtime condition matches the specific logging condition. Similar to setting the logging condition, on-demand aggregating logging does not require the restarting of any applications to reset a logging condition.

On-demand aggregated logging creates an aggregated log that is easily accessible for an administrator of a distributed system, without the need to restart any applications. On-demand aggregated logging potentially reduces the amount of data stored in the aggregated log because on-demand aggregated logging will only aggregate logs that match the specified logging condition. On-demand aggregated logging helps administrators and/or troubleshooters to quickly comprehend their log data with better insight, thereby significantly improving trouble shooting and root-cause analysis.

Figure 3:
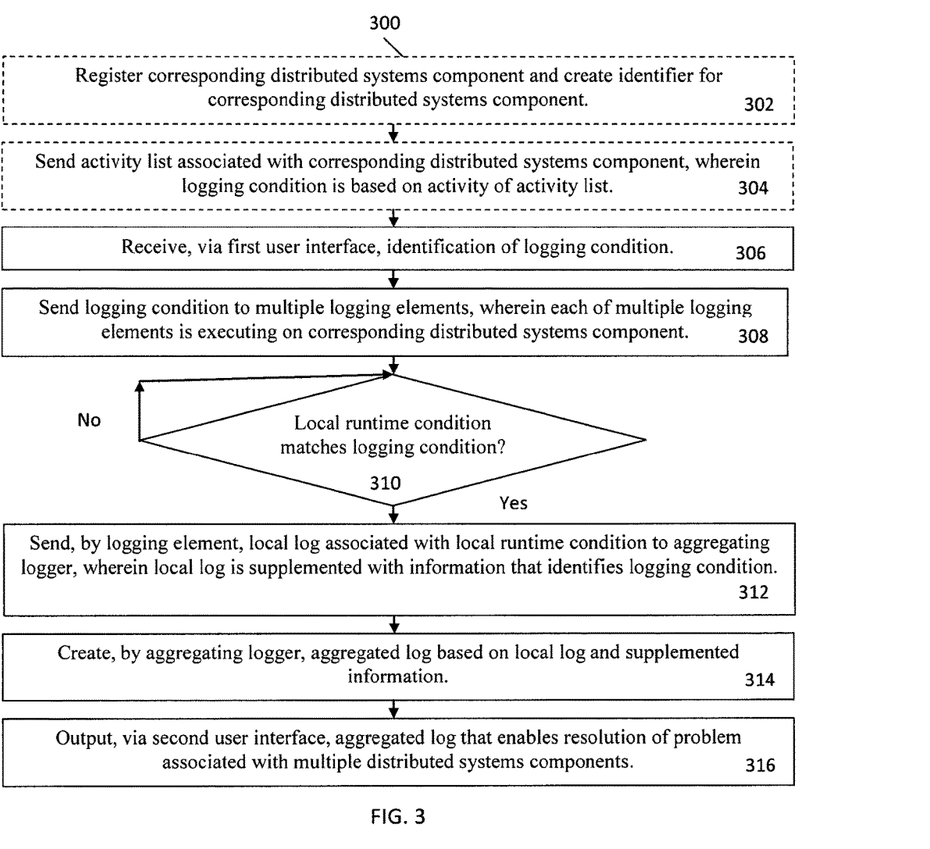
FIG. 3 is a flowchart that illustrates an example method of on-demand aggregated logging for distributed systems, under an embodiment.

FIG. 3 is a flowchart that illustrates a method of on-demand aggregated logging for distributed systems, in an embodiment. Flowchart 300 illustrates method acts illustrated as flowchart blocks for certain steps involved in and between the clients 202-204 and the servers 206-210 of FIG. 2.

A corresponding distributed systems component is optionally registered and an identifier is optionally created for the corresponding distributed systems component, act 302. For example, the first logging element 228 registers the first server 206 as a distributed system component with the aggregated logger 236, and the aggregated logger 236 creates the identifier "400" for first server 206.

An activity list associated with a corresponding distributed systems component is optionally sent, wherein a logging condition is based on an activity of the activity list, act 304. For example, the first logging element 228 sends an activity list associated for the 1$^{st}$ application 216 to the aggregated logger 236, wherein a subsequent logging condition is based on the "checkout" activity of the activity list.

An identification of a logging condition is received via a first user interface, act 306. For example, an administrator responds to a user report of a problem by entering "username=foo, activity=checkout, and product=enterprise content management system content server" as a logging condition.

The logging condition is sent to multiple logging elements, wherein each of the multiple logging elements is executing on a corresponding one of multiple distributed systems components, act 308. For example, the aggregating logger 236 sends the logging condition to the logging elements 228-232 executing on the networked computers 206-208.

A logging element determines whether a local runtime condition matches a logging condition, act 310. For example, the first logging element 228 monitors its local runtime conditions on its own networked computer 206 to determine when the local runtime condition matches a received logging condition. If a local runtime condition matches a logging condition, the flowchart 300 continues to act 312. If a local runtime condition does not match a logging condition, the flowchart 300 returns to act 310 to continue monitoring when the local runtime condition matches the logging condition.

A logging element sends a local log associated with a local runtime condition to an aggregating logger, wherein the local log is supplemented with information that identifies a logging condition, in response to a determination that the local runtime condition matches the logging condition, act 312. For example, when a local runtime condition matches a received logging condition, the first logging element 228 sends the local log, along with an identifier of the logging condition, for that local runtime condition to the aggregating logger 236.

An aggregating logger creates an aggregated log based on the local log and the supplemented information, act 314. For example, the aggregating logger 236 collects the local logs sent from the logging elements, and creates different aggregated logs 238 that correspond to each of the logging conditions.

An aggregated log is output via a second user interface to enable resolution of a problem associated with the multiple distributed systems components, act 316. For example, the aggregating logger 236 outputs the aggregated log 238 to an administrator, wherein the aggregated log 238 enables the administrator to quickly and easily identify the source of the application user's problem.

Although FIG. 3 depicts the acts 302-316 occurring in a specific order, the acts 302-316 may occur in another order. On-demand aggregated logging creates an aggregated log that is easily accessible for an administrator of a distributed system, without the need to restart any applications. On-demand aggregated logging potentially reduces the amount of data stored in the aggregated log because on-demand aggregated logging will only aggregate logs that match the specified logging condition. On-demand aggregated logging helps administrators and/or troubleshooters to quickly comprehend their log data with better insight, thereby significantly improving trouble shooting and root-cause analysis.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for on-demand aggregated logging for distributed systems, the system comprising:
   a processor-based application executed on a computer and configured to:
      receive, by an aggregating logger, an identification of a logging condition via a first user interface, the logging condition corresponding to a problem associated with at least one of a plurality of distributed systems components;
      send, by the aggregating logger, the logging condition to each logging element of a plurality of logging elements, each logging element being executed on a corresponding one of the plurality of distributed systems components;
      receive, by the aggregating logger, a local log from at least one logging element of the plurality of logging elements when a determination is made by the at least one logging element that a local runtime condition matches the logging condition received by the at least one logging element, the local log being supplemented with information that identifies the logging condition received by the at least one logging element;
      create, by the aggregating logger, an aggregated log based on the local log and the supplemented information; and
      output, via a second user interface, the aggregated log that enables resolution of a problem associated with the plurality of distributed systems components.

2. The system of claim 1, wherein the logging condition comprises at least one of a user identifier, an application identifier, an activity identifier, and an identifier associated with the corresponding one of the plurality of distributed systems components.

3. The system of claim 1, wherein receiving the local log from the at least one logging element comprises one of receiving the local log prior to storage of the local log on the corresponding one of the plurality of distributed systems components, receiving the local log concurrent with storage of the local log on the corresponding one of the plurality of distributed systems components, and receiving the local log after storage of the local log on the corresponding one of the plurality of distributed systems components.

4. The system of claim 1, wherein receiving the local log comprises receiving the local log from a message storage, the local log being stored being previously stored to the message storage based on at least one of a duration of time that the local log is stored in the message storage, a remaining capacity associated with the message storage, and a number of local logs stored in the message storage.

5. The system of claim 1, wherein the supplemented information further comprises at least one of a distributed system component identifier, a log message identifier, and a request identifier.

6. The system of claim 1, wherein the processor-based application is configured to:
   register the corresponding one of the plurality of distributed systems components; and
   create an identifier for the corresponding one of the plurality of distributed systems components.

7. The system of claim 1, wherein the processor-based application is configured to:
   receiving, by the aggregating logger, an activity list from the at least one logging element associated with the corresponding one of the plurality of distributed systems components, wherein the logging condition is based on an activity of the activity list.

8. A computer-implemented method for on-demand aggregated logging for distributed systems, the method comprising:
   receiving, by an aggregating logger, an identification of a logging condition via a first user interface, the logging condition corresponding to a problem associated with at least one of a plurality of distributed systems components;
   sending, by the aggregating logger, the logging condition to each logging element of a plurality of logging elements, each logging element being executed on a corresponding one of the plurality of distributed systems components;
   receiving, by the aggregating logger, a local log from at least one logging element of the plurality of logging elements when a determination is made by the at least one logging element that a local runtime condition matches the logging condition received by the at least one logging element, the local log being supplemented with information that identifies the logging condition received by the at least one logging element;
   creating, by the aggregating logger, an aggregated log based on the local log and the supplemented information; and
   outputting, via a second user interface, the aggregated log that enables resolution of a problem associated with the plurality of distributed systems components.

9. The method of claim 8, wherein the logging condition comprises at least one of a user identifier, an application identifier, an activity identifier, and an identifier associated with the corresponding one of the plurality of distributed systems components.

10. The method of claim 8, wherein receiving the local log from the at least one logging element comprises one of receiving the local log prior to storage of the local log on the corresponding one of the plurality of distributed systems components, receiving the local log concurrent with storage of the local log on the corresponding one of the plurality of distributed systems components, and receiving the local log after storage of the local log on the corresponding one of the plurality of distributed systems components.

11. The method of claim 8, wherein receiving the local log comprises receiving the local log from a message storage, the local log being stored being previously stored to the message storage based on at least one of a duration of time that the local log is stored in the message storage, a remaining capacity associated with the message storage, and a number of local logs stored in the message storage.

12. The method of claim 8, wherein the supplemented information further comprises at least one of a distributed system component identifier, a log message identifier, and a request identifier.

13. The method of claim 8, wherein the method further comprises:
   registering the corresponding one of the plurality of distributed systems components; and
   creating an identifier for the corresponding one of the plurality of distributed systems components.

14. The method of claim 8, wherein the method further comprises receiving, by the aggregating logger, an activity list from the at least one logging element associated with the corresponding one of the plurality of distributed systems components, wherein the logging condition is based on an activity of the activity list.

15. A computer program product, comprising a non-transitory computer-readable medium having a computer-readable program code embodied therein, the computer-readable program code adapted to be executed by one or more processors to implement a method for on-demand aggregated logging for distributed systems, the method comprising:
   receiving, by an aggregating logger, an identification of a logging condition via a first user interface, the logging condition corresponding to a problem associated with at least one of a plurality of distributed systems components;
   sending, by the aggregating logger, the logging condition to each logging element of a plurality of logging elements, each logging element being executed on a corresponding one of the plurality of distributed systems components;
   receiving, by the aggregating logger, a local log from at least one logging element of the plurality of logging elements when a determination is made by the at least one logging element that a local runtime condition matches the logging condition received by the at least one logging element, the local log being supplemented with information that identifies the logging condition received by the at least one logging element;
   creating, by the aggregating logger, an aggregated log based on the local log and the supplemented information; and
   outputting, via a second user interface, the aggregated log that enables resolution of a problem associated with the plurality of distributed systems components.

16. The computer program product of claim 15, wherein the logging condition comprises at least one of a user identifier, an application identifier, an activity identifier, and an identifier associated with the corresponding one of the plurality of distributed systems components.

17. The computer program product of claim 15, wherein receiving the local log from the at least one logging element comprises one of receiving the local log prior to storage of the local log on the corresponding one of the plurality of distributed systems components, receiving the local log concurrent with storage of the local log on the corresponding one of the plurality of distributed systems components, and receiving the local log after storage of the local log on the corresponding one of the plurality of distributed systems components.

18. The computer program product of claim 15, wherein receiving the local log comprises receiving the local log from a message storage, the local log being stored being previously stored to the message storage based on at least one of a duration of time that the local log is stored in the message storage, a remaining capacity associated with the message storage, and a number of local logs stored in the message storage.

19. The computer program product of claim 15, wherein the supplemented information further comprises at least one of a distributed system component identifier, a log message identifier, and a request identifier.

20. The computer program product of claim 15, wherein the method further comprises:
   registering the corresponding one of the plurality of distributed systems components; and
   creating an identifier for the corresponding one of the plurality of distributed systems components.

* * * * *